United States Patent [19]

Levine

[11] Patent Number: 4,908,713

[45] Date of Patent: Mar. 13, 1990

[54] VCR PROGRAMMER

[76] Inventor: Michael R. Levine, 2900 Heatherway, Ann Arbor, Mich. 48104

[21] Appl. No.: 213,162

[22] Filed: Jun. 29, 1988

Related U.S. Application Data

[63] Continuation of Ser. No. 634,179, Jul. 24, 1989, abandoned, which is a continuation of Ser. No. 330,111, Dec. 14, 1981, abandoned.

[51] Int. Cl.$^4$ .................. H04N 5/782; H04B 11/16
[52] U.S. Cl. ................................ 358/335; 455/181; 455/186
[58] Field of Search ................ 360/33.1, 69, 79; 358/335, 188; 434/308, 323; 455/171, 178, 181, 185, 186, 344; 340/706, 799

[56] References Cited

U.S. PATENT DOCUMENTS

| 4,004,085 | 1/1977 | Makino et al. | 358/188 |
|---|---|---|---|
| 4,088,958 | 5/1978 | Suzuki et al. | 455/181 |
| 4,222,069 | 9/1980 | Groetschel | 358/335 |
| 4,305,101 | 12/1981 | Yarbrough et al. | 360/69 |
| 4,325,081 | 4/1982 | Abe | 360/33.1 |
| 4,334,242 | 6/1982 | Mangold | 358/335 |
| 4,337,480 | 6/1982 | Bourassin et al. | 358/188 |
| 4,475,153 | 10/1984 | Kihara et al. | 358/335 |
| 4,519,003 | 5/1985 | Scholz | 358/335 |
| 4,598,288 | 7/1986 | Yarbrough et al. | 360/69 |
| 4,641,205 | 2/1987 | Beyers, Jr. | 358/335 |

FOREIGN PATENT DOCUMENTS 2918846 11/1980 Fed. Rep. of Germany ...... 358/335

Primary Examiner—Donald McElheny, Jr.
Attorney, Agent, or Firm—Krass & Young

[57] ABSTRACT

A system for programming the automatic operation of a video recorder over an extended time period uses an associated television receiver as a display device for alphanumeric messages to the operator to provide a self-explanatory, interactive programming routine. The video recorder system includes a digital memory, a real time digital clock, and an alphanumeric character generator, all connected to a central digital controller. A keypad allows the operator to initiate a programming routine in which previously stored programming messages are called up from memory and generated on the TV receiver's display tube using the character generator. The operator's responses entered via the keypad are stored in the memory and are called up at future times to generate control signals for the video recorder. The video recorder system further includes a memory storing data representing a schedule of programming available for a future period. The video recorder system permits this schedule to be recalled and displayed on the TV receiver's display for review by the user.

30 Claims, 2 Drawing Sheets

VCR PROGRAMMER

This application is a continuation of U.S. patent application Ser. No. 634,179, filed July 24, 1984, now abandoned, which is a continuation of U.S. patent application Ser. No. 330,111, filed Dec. 14, 1981, now abandoned.

TECHNICAL FIELD

This invention relates to automatic control systems for video recorders of the type used with television receivers and more particularly to a system for using the television receiver as a display device for an operator interactive system for programming future automatic operation of the recorder.

BACKGROUND ART

Magnetic video recorders are commonly used as accessories for television receivers to record broadcast television programs for later replay over the receivr or to record the output of a TV camera so the users may produce their own programs.

Frequently it is desirable to make recordings of broadcastor cablecast video programs which originate at times when the operator is not available to control the recorder and many commercially available video recorders are equipped with programming devices that enable the video recorder at a predetermined future time. Some of these video recorders include built-in tuners and a program can be established that specifies the time at which a recording is to start and stop as well as the channel to be recorded. U.S. Pat. No. 4,193,120 discloses a video recorder with this capability.

The programming of these devices is usually accomplished through use by the operator of a series of pushbuttons and multiple selector switches with the aid of a numerical display incorporated in the video recorder. In systems in which a plurality of recording instructions relating to a number of programs on different channels at different times can be recorded, the programming sequence is complex and difficult to remember and achieve. The process is susceptible to error and it is difficult or impossible to determine the sequence of programming commands that have already been recorded. Moreover, the control panels of these progammable recorders are complicated, including a number of separate input devices and displays and are accordingly expensive to manufacture and susceptible to failure in use.

DISCLOSURE OF THE INVENTION

The present invention is accordingly directed toward a programming control for video recorders that is easier to use and less complicated and expensive than existing systems. This simplification is achieved by using the television receiver associated with the video recorder as a display device and providing the video recorder with a digital memory that stores an interactive programming routing for directing the operator through the programming sequence on a simple-to-follow, step-by-step basis. The operator initiates the routine by actuating a control that places the system in its programming mode. Programming instructions are then displayed to the operator on the TV receiver picture tube in alphanumeric and/or graphic form. The instructions direct the operator in the use of the controls to record a desired programming routine on a step-by-step basis and display the routine to insure proper programming.

In the preferred embodiment of the invention, which will subsequently be disclosed in detail, the operator input device consists of a simple keypad for the decimal numerals and several mode selection keys. This keypad supplants all of the pushbuttons, selector switches and digital displays employed in prior art video recorders, lowering the cost of the system and simplifying its maintenance.

The programming control of the present invention employs a random access memory for storing alphanumeric statements to be displayed on the TV receiver and future programming commands entered into the system by the operator. A character generator forming part of the system receives the stored command statements in encoded form and generates luminance control signals for the television receiver. These signals are generated in timed relation to horizontal and vertical synchronizing signals generated by a digital clock that also provides an output indicative of real time as opposed to machine time. The synchronizing signals and the outputs of the character generator are fed to an RF modulator which also receives video signals played back from the tape. The modulator produces a signal that is provided to the antenna terminals of the TV receiver.

The system operates under the supervision of a controller which preferably takes the form of a microcomputer and includes a read-only memory storing the operating program for the system. The controller receives the output of the keypad and uses it to control the display of messages on the TV receiver, the storage of operator-entered control signals into the random access memory and the automatic, unattended operation of the video recorder under control of the future programming commands stored in the random access memory for use in the system. The controller preferably produces a series of menus on the television receiver screen which are selected via decimal keys on the keypad. The controller also preferably displays the desired future recording time and channel for verification.

The character generator can also be used to generate a display of alphanumeic information stored on the magnetic tape of the video recorder. Alphanumeric information can be stored on the magnetic tape with a much higher density when it is digitally encoded rather than in video form.

The present invention also incorporates means for recording a future program schedule which may either by provided via airwave or cable broadcast or alternatively may be inserted into the device in the form of a throw-away read-only memory. These schedules may be displayed as an assist to the programming of the video recorder.

In a further embodiment of the present invention the controller transmits control signals for separate control of the television receiver from control inputs received at the operator input device.

Other objectives, advantages and applications of the present invention will be made apparent by the following detailed description of a preferred embodiment. The description makes reference to the accompanying drawings in which:

DETAILED DESCRIPTION OF THE PREFERRED EMBODIMENT

Figure 1:
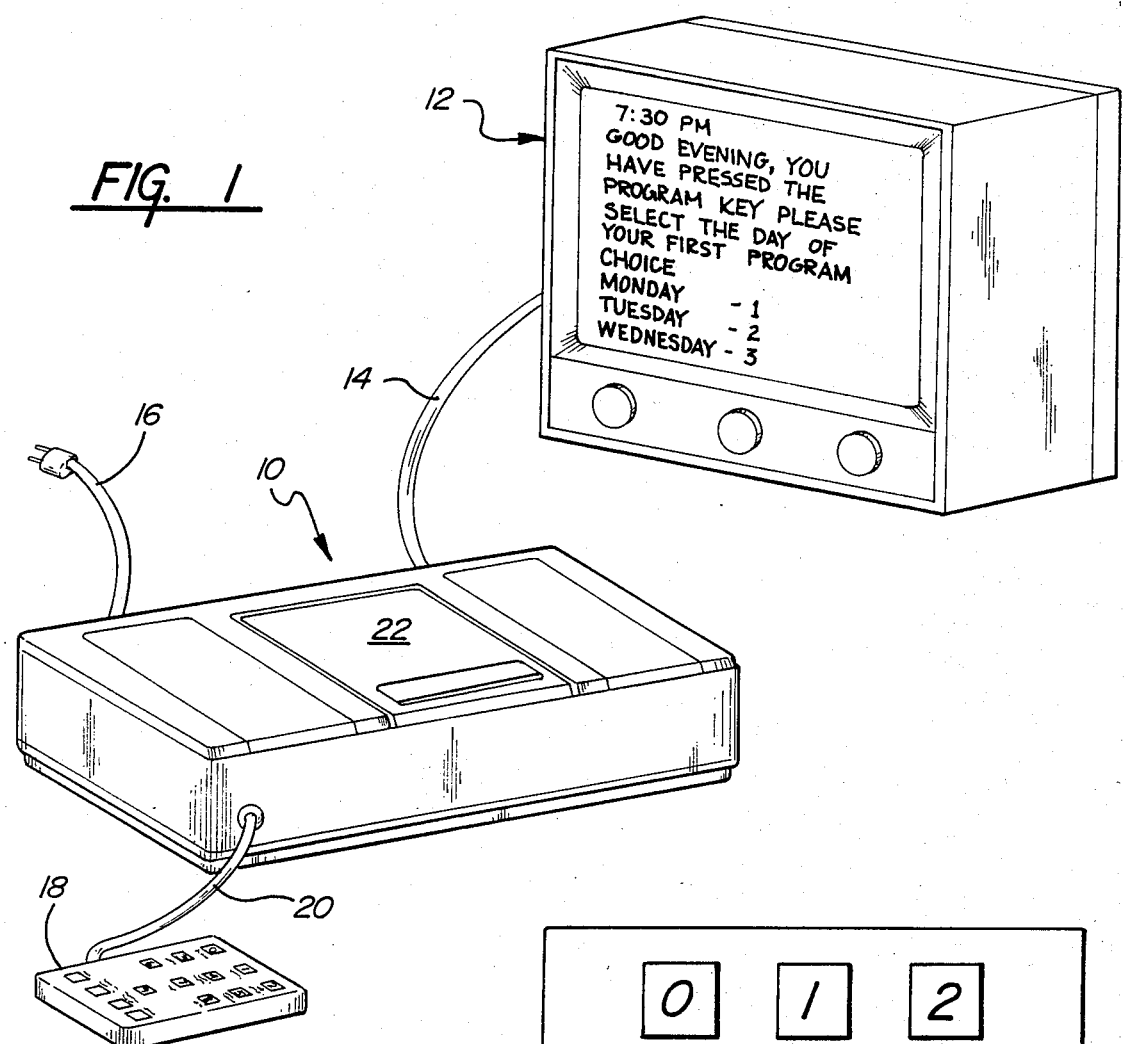
FIG. 1 is a perspective view of a video recorder forming a preferred embodiment of the present invention connected to an associated TV receiver.

The programming control device of the present invention may be embodied in a separate unit adapted to be connected to a conventional video recorder and to a television receiver, but in the preferred embodiment of the invention, illustrated in FIG. 1, the programming control is incorporated within a video cassette recorder system, generally indicated at 10. Video recorder system 10 is illustrated as being connected to a conventional television receiver 12 through cable 14 that preferably connects to the antenna terminals of the receiver 12. The video recorder system 10 is powered through a conventional alternating current line cord 16.

Operator input to the video recorder system 10 is provided through a keypad 18 connected to the recorder by a flexible cable 20. In alternative embodiments of the invention, keypad 18, or its equivalent, could be built into the chassis of the video recorder system 10 or could be connected to the video recorder system 10 by a conventional communication link such as telephone, radio or an infrared transmitter incorporated in the remote unit and a corresponding receiver disposed in the video recorder system 10. These wireless links may be of the same type used for the remote control of television receivers.

Video recorder system 10 includes an access panel 22 which may be manually opened to permit insertion or removal of standard video tape cassettes and a socket not shown for receipt of program schedule disposable memories. The video recorder system 10 will typically include a record-playback head, spindles for transporting the tape between take-up and supply reels of the cassette, and other hardware typically associated with such a machine, which are not shown.

Figure 2:
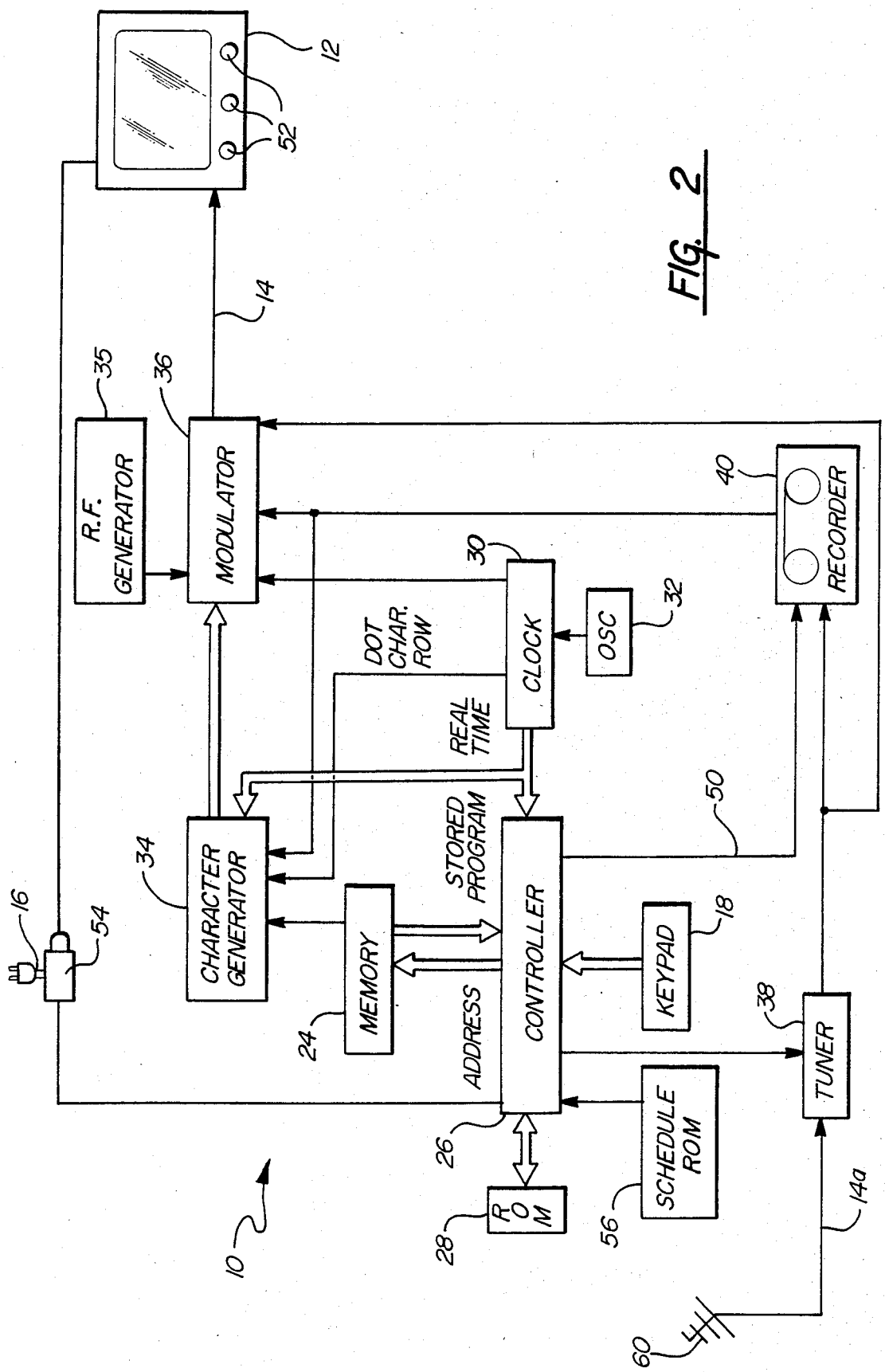
FIG. 2 is a block diagram of the system.

The broad electrical arrangement of the preferred embodiment of the present invention is illustrated in block form in FIG. 2.

The system includes a digital, random access memory 24. The memory 24 is supervised by a digital controller 26. In the preferred embodiment of the invention the controller takes the form of a microprocessor such as Zilog Z-80 or Intel 8080. In alternative embodiments of the invention the controller could be implemented with discrete components. A readonly memory 28 is connected to the controller and provides the operating program for the video recorder system 10. In alternative embodiments of the invention the operating program could be stored in part of the digital memory 24 so that only a single memory chip would be required for the video recorder system.

A clock 30 driven by pulses from a high frequency Quartz oscillator 32 is used to generate real time signals for use in programming the video recorder system 10 as well as synchronizing signals which are used to control the generation of display signals and the raster of the television receiver 12. The oscillator 32 preferably has a frequency of about 15.75 MHz and includes conventional dividers used to generate dot, character and row signals for provision to a character generator 34, forming part of the system, as well as horizontal and vertical synchronizing signals which are provided to a radio frequency modulator 36. The moduator operates on the output of a radio frequency generator 35. The video recorder system 10, further includes an electronically adjustable TV channel tuner 38 connected to the TV set antenna 60 through portion 14a of the cable 14 and to the magnetic video record/playback unit 40.

Figure 3:
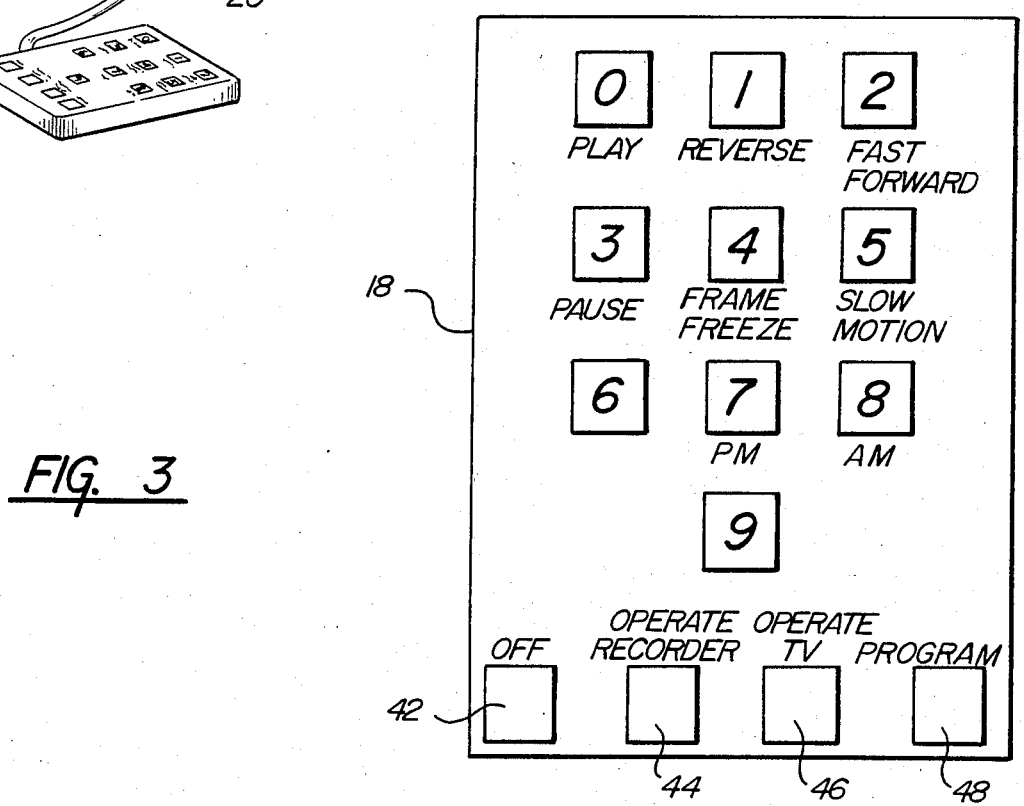
FIG. 3 is an illustration of the keypad used with the preferred embodiment of the invention.

The arrangement of the preferred embodiment of the keypad 18 is illustrated in FIG. 3. It should be recognized tht other manual input control devices could be used and other keypad configurations could be employed in alternative embodiments of the invention. The preferred embodiment of the keypad 18 incorporates fourteen keys. Ten of the keys designate the decimal numerals and also have legends representing alternate functions. For example, the key that represents numeral 0 also has a designation "play" and is used to control energization of the video record/playback unit 40 when the system is in the proper mode.

The keypad also includes four mode keys 42, 44, 46 and 48. The key 42 is labeled "off" and allows the operator to de-energize the system. The key 44 is labeled "operate recorder". Depression of this key enters the video recorder system 10 into a mode in which the video recorder system 10 40 may be controlled through energization of the numeric keys of the pad. For example, key 0 is designated "play" and enables forward operation of the video record/playback unit 40 at normal speed. Numeric key 1 is labeled "reverse" and depression of this key causes reversal of the tape. Similarly, numeric key 2 is designated "fast forward"; numeric key 3 is designated "pause"; numeric key 4 is designated "frame freeze"; and numeric key 5 is designated "slow". Each of these keys implements the designated operation of the recorder. These operations are achieved by control signals provided to the video record/playback unit 40 from the controller 26 over line 50. These operating modes are part of the normal complement of modes of operation of conventional, commercially available, video recorders and any new modes of operation incorporated in recorders in the future could be similarly controlled.

Keypad button 46, when depressed, enters the video recorder system 10 into an "operate TV" mode wherein the channel selection of the TV may be controlled by depression of pairs of numeric keys. For example, to tune channel 7 the keys 07 would be depressed. This key sequence causes the controller 26 to provide signals to the tuner 38 causing it to tune channel 7. The output of the tuner 38 is then provided to the modulator 36. The modulator uses these signals to modulate a radio frequency signal produced by the generator 35 and having the wavelength of an unused channel on the television reciever 12. For example, if there is no local television station broadcasting on channel 5, the frequency of that station may be produced by generator 35. The television receiver 12 may be used in the normal manner by operator actuation of its controls 52. When operation of the TV receiver 10 in connection with the video recorder system 10 and its programming system is desired, the manual channel control of the receiver 12 is turned to channel 5 and it is then capable of receiving signals outputted by the modulator 36. In this manner the internal tuner of the receiver 12 is not used for active channel control.

In alternative embodiments of the invention the remote control unit could be equipped with the capability of controlling other functions of the TV receiver 12 such as its volume, contrast, etc. This mode of control would require a more complex set of connections between the video recorder system 10 and the TV receiver 12. Electrically powered devices other than the TV receiver 12 could be similarly controlled.

Depression of the keypad button 48 places the video recorder system 10 in the program mode in which the operator may specify a future operating program for the video recorder system 10. This mode uses the interactive capabilities of the television receiver 12. The nature of this interactive programming machine will be subsequently specified in greater detail.

The television receiver 12 power cord is preferably plugged into a unit 54 that also receives the unit line cord 16 and provides electrical power to video recorder system 10. The unit 54 operates under supervision of the central controller 26. The television receiver power switch is left in the "on" position when the programmer is to be used and the application of power to the TV receiver 12 is controlled by the unit 54 under supervision of controller 26. When the modes controlled by the switches 44, 46 or 48 are entered, the TV receiver 12 is energized and when the button 42 is depressed the TV receiver 12 is de-energized. The TV receiver need not be energized during programmed operation of the video recorder system 10 as stored in the system.

Alphanumeric or graphic messages to be displayed on the face of the TV receiver 12 are initiated by the controller 26 by providing digital codes representative of the character sequences to the character generator 34. The character generator stores the appropriate dot matrix characters and outputs Z axis control signals to modulator 36 in timed relation to the generation of the dot, character and row signals by the clock 30. This is the conventional arrangement for generating alphanumeric information on a TV raster scan display and the arrangement may take the detailed form disclosed in U.S. Pat. No. 4,146,877.

The alphanumeric messages to be displayed may be stored in the memory 24 and called up by the controller 26 or they may be recorded on a magnetic tape played in the video record/playback unit 40. In the latter case the recorded information should contain codes specifying the formatting in terms of lines and paragraphs so that the system can generate the material in timed relation to the synchronizing signals provided to modulator 36 by the clock 30.

Alternatively, the synchronizing signals could be derived from the horizontal and vertical sync generators of the TV receiver 12. This arrangement allows alphanumeric information from the video recorder system 10 to be displayed superimposed over broadcast programs being displayed on the receiver.

When the video recorder system 10 is in operation in either the operate recorder or operate TV mode, the character generator may be used to display alphanumeric information in super-position with the video picture generated from either the record/playback unit 40 or the tuner 38. Information might include the present time, the tuner channel in use, or the title of a prerecorded program, with the title information either being broadcast in a coded form or entered via an appropriate keyboard (not shown).

The video recorder system 10 may be configured to accept a plug-in read only memory 56 containing a program schedule for some future period such as a week or month. Those ROM's might be sold on a subscription basis, in the same way as magazines, and contain digitally encoded alphanumeric and graphic information that could be displayed on the TV receiver 12 to assist the operator in selecting a program for future recordings. The ROM 56 could simply contain a schedule showing the programs available during the scheduled period on each channel, or might additionally include text describing the program or even segments of the program for display.

In alternative embodiments of the invention the schedule information might be broadcast at a particular time and the video recorder system 10 could be programmed to record that information during the broadcast time for later display and use.

When the video recorder system 10 is in the off mode the controller 26 interrogates the memory 24 to derive the start time of the next program to be recorded. This start time is continually compared with the real time as generated by the clock 30 and when the two are in coincidence the controller 26 interrogates the memory to derive the number of the channel to be recorded, controls the tuner 38 to select that channel and initiates the video record/playback unit 40. At the end time of the recording the controller 26 turns off the video record/playback unit 40 and the video recorder system 10. This arrangement is conventional, and is disclosed, among other places, in the U.S. Pat. No. 4,193,120.

When the video recorder system 10 is in the operate recorder mode enabled by depressing the pushbutton 44 the recorded TV signals are provided by the video record/playback unit 40 directly to the modulator 36 and there is not need to modulate the sync pulses generated by the clock 30.

In the play recorder mode it is possible to have playback of alphanumeric information encoded on the tape in digital form. For this purpose the output of the video record/playback unit 40 is provided to the character generator 34. The signals from the clock 30 are used to generate the sync signals which are provided to the modulator 36 as well as dot, character and row signals which are provided to the character generator 34 so that the alpha-numeric information can be encoded on the appropriate carrier and provided to the TV reciever 12.

In the program mode, initiated by the operator by depression of key 48, the controller 26 provides addresses to the memory 24 of coded alpha-numeric statements which are displayed on the television receiver 12 through action of the character generator 34 and the modulator 36. The displayed statements will request the operator to provide the video recorder system 10 with information relative to his programming choices by hitting appropriate keys on the pad 18. Following each choice the information will be displayed to allow verification and a further item of information will be requested. The operator need only follow the sequence of commands to achieve the desired program. If the operator depresses keys which signify an inappropriate response, such as starting a programming selection at 14:01 p.m., the controller will choose a display statement that will advise the operator of his error. The programming choices are displayed so the operator has the opportunity to correct erroneous choices.

The system may maintain a total of programmed recording time and display the result so that the operator will recognize the total length of tape required.

The command statements are preferably arranged in such a simple and self-correcting manner that the operator need only have the knowledge to enter the system into the programming mode in order to successfully complete the program.

The system of the present invention is therefore mechanically simpler than previous programming devices and results in a simple and error-free program routine.

What is claimed is:

1. A video recorder interactive control system for connection to a source of television signals and a television display, the system comprising:
    an electronically adjustable television channel tuner connected to the source of television signals;
    a video record/playback means having a input connected to said television channel tuner and a video output, said video record/playback means operating in a record mode for recording the television signal tuned by said television channel tuner and in a playback mode for reproducing a previously recorded television signal;
    a character generator having an input for receiving digital signals representative of a video display, said character generator being operative to convert said digital signals into a video signal;
    an interface means connected to the television display, said video record/playback means and said character generator for displaying either said video signal from said video record/playback means or said video signal from said character generator via the television display;
    a clock means for generating a real time clock signal indicative of the current time;
    a record program memory having stored therein the channel and the time of occurrence of at least one instance of a future program which it is desired to record;
    a schedule memory having stored therein a plurality of digital signals representative of a schedule of television programming available for a future period;
    an operator controlled input means for entering a plurality of control inputs for said video recorder interactive control system; and
    a control means connected to said television channel tuner, said video record/playback means, said character generator, said interface means, said clock means, said message memory, said record program memory, said schedule memory and said input means, said control means being operative to
        supply a channel input to said television channel tuner in accordance with control inputs from said input means,
        place said video record/playback means in either record mode or playback mode in response to control inputs from said input means,
        store the channel and the time of at least one instance of a desired future recording program in said record program memory in response to control inputs from said input means,
        compare said real time clock signal with the time for the next instance of a desired future recording program stored in said record program memory,
        supply said channel stored in said record program memory for an instance of a desired future recording program to said television channel tuner,
        recall digital signals representative of an appropriate portion of the schedule of programming available for a future period from said schedule memory,
        supply said digital signals to said character generator, and
        select said video signal from said character generator at said interface means for display via the television display.

2. The video recorder interactive control system as claimed in claim 1, further comprising:
    a message memory having stored therein a plurality of digital signals representative of a plurality of prompting messages for an operator; and said control means being further operative to
        recall digital signals representative of appropriate prompting messages from said message memory,
        supply said digital signals to said character generator,
        select said video signal from said character generator at said interface means for display via the television display, and
        store the channel and time of at least one instance of a desired future recording program in said record program memory in accordance with an interactive program adapted to receive control inputs from said input means, said interactive program being operative to adaptively select said prompting messages according to the previous control inputs from said input means.

3. The video recorder interactive control system as claimed in claim 1, wherein:
    said schedule of television programming available for a future period stored in said schedule memory includes the program available during each scheduled period for each channel contained in said television signal.

4. The video recorder interactive control system as claimed in claim 3, wherein:
    said schedule of television programming available for a future period stored in said schedule memory further includes text describing at least one program.

5. The video recorder interactive control system as claimed in claim 3, wherein:
    said schedule of television programming available for a future period stored in said schedule memory further includes digitally encoded graphic information.

6. The video recorder interactive control system as claimed in claim 3, wherein:
    said schedule of television programming available for a future period stored in said schedule memory further includes segments of at least one program for display.

7. The video recorder interactive control system as claimed in claim 1, wherein:
    said schedule memory consists of a plug-in read only memory.

8. The video recorder interactive control system as claimed in claim 30, wherein:
    said schedule memory consists of a throw-away read only memory.

9. The video recorder interactive control system as claimed in claim 1, wherein:
    said schedule memory is loaded via the source of television signals.

10. The video recorder interactive control system as claimed in claim 9, wherein:
said interface means includes means to simultaneously display said video signal from said video record/playback means and said video signal from said character generator via the television display by superposition of said video signal from said character generator on said video signal from said video record/playback means; and said control means is further operative to
supply digital signals representative of a program title from a video tape to said character generator, and select superposition of said video signal from said video record/playback means at said interface means for display via the television display when in said playback mode.

11. A program schedule display generator for use in connection with a television receiver comprising:
a schedule memory having stored therein a plurality of digital signals representative of a schedule of programming available for a future period;
a character generator having an input for receiving digital signals representative of a video display, said character generator being operative to convert said digital signals into a video signal;
an interface means connected to the television receiver and said character generator for displaying said video signal from said character generator via the television receiver;
a control means connected to said schedule memory, said character generator and said interface means, said control means being operative to recall digital signals representative of an appropriate portion of the schedule of programming available for a future period from said schedule memory and supply said digital signals to said character generator for display via the television receiver.

12. The program schedule display generator as claimed in claim 11, wherein:
said schedule of programming available or a future period stored in said schedule memory includes the program available during each scheduled period for each channel.

13. The program schedule display generator as claimed in claim 12, wherein:
said schedule of programming available for a future period stored in said schedule memory further includes text describing at least one program.

14. The video recorder interactive control system as claimed in claim 12, wherein:
said schedule of programming available for a future period stored in said schedule memory further includes digitally encoded graphic information.

15. The program schedule display generator as claimed in claim 12, wherein:
said schedule of programming available for a future period stored in said schedule memory further includes segments of at least one program for display.

16. The program schedule display generator as claimed in claim 11, wherein:
said schedule memory consists of a plug-in read only memory.

17. The program schedule display generator as claimed in claim 11, wherein:
said schedule memory consists of a throw-away read only memory.

18. The video recorder interactive control system as claimed in claim 11, wherein:
said schedule memory is loaded via a source of RF signals at a particular time.

19. A video recorder interactive control system for connection to a source of television signals and to a television display, the system comprising:
a video recorder system housing;
an electronically adjustable television channel tuner disposed in said video recorder system housing and connected to the source of television signals;
a video record/playback means disposed in said video recorder system housing and having a input connected to said television channel tuner and having an output, said video record/playback means operating in a record mode for recording the television signal tuned by said television channel tuner and in a playback mode for reproducing a previously recorded video signal on said output;
a character generator disposed in said video recorder system housing and having an input for receiving digital signals representative of alphanumeric characters, said character generator being operative to convert said digital signals into video signals;
an interface means disposed in said video recorder system housing and connected to the television display, to said video record/playback means and to said character generator for displaying either said output signal from said video record/playback means or said video signal from said character generator via the television display;
a clock means disposed in said video recorder system housing for generating a real time clock signal indicative of the current time;
a message memory disposed in said video recorder system housing and having stored therein a plurality of digital signals representative of a plurality of alphanumeric prompting messages for an operator;
a record program memory disposed in said video recorder system housing and being operative to store the channel and the time of occurrence of a plurality of future programs that are to be recorded;
a first operator controlled input means disposed remotely from said video recorder system housing for entering a plurality of control inputs for said video recorder interactive control system including the channel and start time of future programs that are to be recorded in said record program memory;
second operator controlled input means disposed on said video recorder system housing not including means for entering the channel and start time of future programs to be recorded; and
a control means disposed in said video recorder system housing and connected to said television channel tuner, said video record/playback means, said character generator, said interface means, said clock means, said message memory, said record program memory and said first and second input means, said control means being operative to
supply a channel input to said television channel tuner in accordance with control inputs from said first or second input means,
place said video record/playback means in either record mode or playback mode in response to control inputs from said first or second input means, recall digital signals representative of appropriate prompting messages from said message memory, supply said digital signals to said character generator, select said video signal from said character generator at said interface means for display via the television display, store the channel and start time of future programs that are to be recorded in said record program memory in accordance with an interactive program adapted to receive control inputs from said first input means, said interactive program being operative to adaptively select said prompting messages according to the previous control inputs from said input means, compare said real time clock signal with the time for the next instance of a desired future recording program stored in said record program memory, supply said channel stored in said record program memory to said television channel tuner;

and place said video record/playback means in record mode when said real time signal is included within a time stored in said record program memory for the recording of a program;

whereby said first operator controlled input means disposed remotely from said video recorder system housing replaces substantially all controls for entering the channel and start time of future programs that are to be recorded, which controls would otherwise be disposed on said video recorder system housing.

20. The video recorder interactive control system as claimed in claim 19, wherein:

said first operator controlled input means is connected to said control means via a cable.

21. The video recorder interactive control system as claimed in claim 19, wherein:

said first operator controlled input means is connected to said control means via a telephone line.

22. The video recorder interactive control system as claimed in claim 19, wherein:

said first operator controlled input means is connected to said control means via an radio transmitter.

23. The video recorder interactive control system as claimed in claim 19, wherein:

said first operator controlled input means is connected to said control means via an infrared transmitter.

24. The video recorder interactive control system as claimed in claim 19, wherein:

said first operator controlled input means includes a keypad having a set of keys corresponding to decimal numbers and at least one mode selection key.

25. The video recorder interactive control system as claimed in claim 24, further including designation indica for said set of keys wherein:

said designation indicia are modified to designate symbols corresponding to video record/playback means operation upon selection of a predetermined one of said at least one mode selection key.

26. A video recorder interactive control system for connection to a source of television signals and to a television display, the system comprising:

an electronically adjustable television channel tuner connected to the source of television signals;

a video record/playback means having an input connected to said television channel tuner and having an output, said video record/playback means operating in a record mode for recording the television signal tuned by said television channel tuner and in a playback mode for reproducing a previously recorded video signal on said output;

a character generator having an input for receiving digital signals representative of alphanumeric characters, said character generator being operative to convert said digital signals into video signals;

an interface means connected to the television display, to said video record/playback means and to said character generator for displaying either said output signal from said video record/playback means or said output signal from said character generator via the television display;

a clock means for generating a real time clock signal indicative of the current time;

a message memory having stored therein a plurality of digital signals representative of a plurality of alphanumeric prompting messages for an operator;

a record program memory being operative to store therein the channel and the time of occurrence of a plurality of desired future programs that are to be recorded;

a keypad having a set of keys corresponding to decimal numbers and at least one mode selection key, said at least one mode selection key including a record program mode selection key; and a control means connected to said television channel tuner, said video record/playback means, said character generator, said interface means, said clock means, said message memory, said record program memory, said schedule memory and said keypad, said control means being operative to supply a channel input to said television channel tuner in accordance with control inputs from said keypad, place said video record/playback means in either record mode or playback mode in response to control inputs from said keypad, recall digital signals representative of appropriate prompting messages from said message memory, supply said digital signals to said character generator, select said video signal from said character generator at said interface means for display via the television display, store the channel and the time of at least one instance of a desired future recording program in said record program memory in accordance with an interactive program adapted to receive input from said kaypad, said interactive program being operative to adaptively select said prompting messages corresponding to menu selections according to the previous decimal key inputs from said keypad, compare said real time clock signal with the time for the next instance of a desired future recording program stored in said record program memory, supply said channel stored in said record program memory to said television channel, and place said video record/playback means in record mode when said real time signal is included within the time for that instance of a desired future recording program stored in said record program memory.

27. A video recorder interactive control system for connection to a source of television signals and to a television display, the system comprising:
- an electronically adjustable television channel tuner connected to the source of television signals;
- a video record/playback means having an input connected to said television channel tuner and an output, said video record/playback means operating in a record mode for recording the television signal tuned by said television channel tuner and in a playback mode for reproducing a previously recorded video signal on its output;
- a character generator having an input for receiving digital signals representative of a video display, said character generator being operative to convert said digital signals into a video signal;
- an interface means connected to the television display, said video record/playback means and said character generator for displaying either said video signal from said video record/playback means or said video signal from said character generator via the television display;
- a clock means for generating a real time clock signal indicative of the current time;
- a message memory having stored therein a plurality of digital signals representative of a plurality of prompting messages for an operator;
- a record program memory having stored therein the channel and the time of at least one instance of a future program which the operator desires to record;
- an operator controlled input means for entering a plurality of control inputs for said video recorder interactive control system; and
- a control means connected to said television channel tuner, said video record/playback means, said character generator, said interface means, said clock means, said message memory, said record program memory and said input means, said control means being operative to
  - supply a channel input to said television channel tuner in accordance with control inputs from said input means,
  - place said video record/playback means in either record mode or playback mode in response to control inputs from said input means,
  - recall digital signals representative of appropriate prompting messages from said message memory,
  - supply said digital signals to said character generator,
  - select said video signal from said character generator at said interface means for display via the television display,
  - and store the channel and the time of at least one instance of a desired future recording program in said record program memory in accordance with an interactive program adapted to receive control inputs from said input means, said interactive program being operative to
    - adaptively select said prompting messages according to the previous inputs from said input means,
    - display the channel and the time of the present desired future recording program for verification via said input means,
  - compare said real time clock signal with the time for the next instance of a desired future recording program stored in said record program memory,
  - supply said channel stored in said record program memory to said television channel and place said video record/playback means in record mode when said real time signal is included within the time for that instance of a desired future recording program stored in said record program memory.

28. A video recorder interactive control system for connection to a source of television signals and a television receiver, the system comprising:
- an electronically adjustable television channel tuner connected to the source of television signals;
- a video record/playback means having an input connected to said television channel tuner and a video output, said video record/playback means operating in a record mode for recording the television signal tuned by said television channel tuner and in a playback mode for reproducing a previously recorded video signal;
- a character generator having an input for receiving digital signals representative of a video display, said character generator being operative to convert said digital signals into video signals;
- a radio frequency modulator connected to the television receiver, said video record/playback means and said character generator for controllably modulating a radio frequency carrier with a selected one of either said video signal from said video record/playback means or said video signal from said character generator and supplying said modulated radio frequency carrier to the television receiver;
- a clock means for generating a real time clock signal indicative of the current time;
- a message memory having stored therein a plurality of digital signals representative of a plurality of prompting messages for an operator;
- a record program memory having stored therein the channel and the time of at least one instance of a desired future recording program;
- an operator controlled input means for entering a plurality of control inputs for said video recorder interactive control system and for the television receiver; and
- a control means connected to said television channel tuner, said video record/playback means, said character generator, said interface means, said clock means, said message memory, said record program memory and said input means, said control means being operative to
  - supply a channel input to said television channel tuner in accordance with control inputs from said input means,
  - place said video record/playback means in either record mode or playback mode in response to control inputs from said input means,
  - recall digital signals representative of appropriate prompting messages from said message memory,
  - supply said digital signals to said character generator,
  - select said video signal from said character generator for modulation by said radio frequency modulator for supply to the television receiver, and store the channel and time of at least one instance of a desired future recording program in said record program memory in accordance with an interactive program adapted to receive control inputs from said input means, said interactive program being operative to adaptively select said prompting messages according to the previous control inputs from said input means, compare said real time clock signal with the time for the next instance of a desired future recording program stored in said record program memory, supply said channel stored in said record program memory to said television channel place said video record/playback means in record mode when said real time signal is included within the time for that instance of a desired future recording program stored in said record program memory, and transmit control signals to the television receiver in response to control inputs for the television receiver from said operator controlled input means.

29. A video recorder interactive control system for connection to a source of television signals and a television display, the system comprising:

an electronically adjustable television channel tuner connected to the source of television signals;

a video record/playback means having an input connected to said television channel tuner, a video output and being adapted to receive a video tape, said video record/playback means operating in a record mode for recording the television signal tuned by said television channel tuner and in a playback mode for reproducing a video signal previously recorded on a video tape;

a character generator having an input for receiving digital signals representative of a video display, said character generator being operative to convert said digital signals into a video signal;

an interface means connected to the television display, to said video record/playback means and to said character generator for displaying either said video signal from said video record/playback means or said video signal from said character generator via the television display;

a clock means for generating a real time clock signal indicative of the current time;

a message memory having stored therein a plurality of digital signals representative of a plurality of prompting messages for an operator;

a record program memory having stored therein the channel and the time of occurrence of at least one instance of a desired future recording program;

an operator controlled input means for entering a plurality of control inputs for said video recorder interactive control system; and a control means connected to said television channel tuner, said video record/playback means, said character generator, said interface means, said clock means, said message memory, said record program memory and said input means, said control means being operative to supply a channel input to said television channel tuner in accordance with control inputs from said input means, place said video record/playback means in either record mode or playback mode in response to control inputs from said input means, compare said real time clock signal with the time for the next instance of a desired future recording program stored in said record program memory, supply said channel stored in said record program memory to said television channel, place said video record/playback means in record mode when said real time signal is included within the time for that instance of a desired future recording program stored in said record program memory, recall digital signals representative of appropriate prompting messages from said message memory, supply said digital signals to said character generator, select said video signal from said character generator at said interface means for display via the television display, and store the channel and time of at least one instance of a desired future recording program in said record program memory in accordance with an interactive program adapted to receive control inputs from said input means, said interactive program being operative to adapatively select said prompting messages according to the previous control inputs from said input means, and place said video record/playback means in playback mode and transmitting alphanumeric messages stored on a video tape to the television display via said interface means.

30. The video recorder interactive control system as claimed in claim 29, wherein:

said character generator is further connected to said video record/playback means for receiving digital signals indicative of alphanumeric characters from a video tape for display by the television display via said interface means.

* * * * *

UNITED STATES PATENT AND TRADEMARK OFFICE
CERTIFICATE OF CORRECTION

PATENT NO.   : 4,908,713

DATED        : March 13, 1990

INVENTOR(S)  : Michael R. Levine

It is certified that error appears in the above-identified patent and that said Letters Patent is hereby corrected as shown below:

On the face of the patent under the Related U.S. Application Data section, after "Continuation of Serial No. 634,179" delete "July 24, 1989" and insert --July 24, 1984--.

On the face of the patent under the References Cited section, insert the following references:

--U.S. Patent No. 4,203,130, 5/1980 Doumit et al.--

--U.S. Patent No. 4,161,728, 7/1979 Insam--

--U.S. Patent No. 4,052,719, 10/1977 Hutt et al.--

--U.S. Patent No. 4,531,021, 7/1985 Bluestein et al.--

--U.S. Patent No. 4,287,597, 9/1981 Paynter et al.--

--U.S. Patent No. 4,536,791, 8/1985 Campbell et al.--

--U.S. Patent No. 4,488,179, 12/1984 Kruger et al.--

--U.S. Patent No. 2,875,270, 2/1959 Wendt et al.--

--U.S. Patent No. 4,390,901, 6/1983 Keiser--

UNITED STATES PATENT AND TRADEMARK OFFICE
CERTIFICATE OF CORRECTION

PATENT NO. : 4,908,713

DATED : March 13, 1990

INVENTOR(S) : Michael R. Levine

It is certified that error appears in the above-identified patent and that said Letters Patent is hereby corrected as shown below:

Column 1, Line 21, delete "receivr" insert --receiver--.

Column 1, Line 61, delete "routing" insert --routine--.

Column 2, Line 18, after "in" insert --digitally--.

Column 2, Line 47, delete "alphanumeic" insert --alphanumeric--.

Column 3, Line 60, after "system" insert --10--.

Column 4, Line 27, delete "video recorder system 10" insert --video record/playback unit--.

Column 4, Line 37, delete "recorder" insert --video record/playback unit 40--.

Column 4, Line 62, delete "10" insert --12--.

Column 5, Line 27, after "receiver" insert --12--.

Column 5, Line 61, after "the" insert --video--.

Column 6, Line 27, delete "video recorder system" insert --system--.

UNITED STATES PATENT AND TRADEMARK OFFICE
CERTIFICATE OF CORRECTION

PATENT NO. : 4,908,713

DATED : March 13, 1990

INVENTOR(S) : Michael R. Levine

Page 3 of 3

It is certified that error appears in the above-identified patent and that said Letters Patent is hereby corrected as shown below:

Column 6, Line 66, delete "system" insert --video recorder syste 10--.

Column 7, Line 6, delete "system" insert --video recorder system 10--.

Column 8, Line 62, delete "30" insert --1--.

Column 9, Line 41, delete "or" insert --for--.

Column 11, Line 45, Cl. 22, 4, delete "an" insert --a--.

Column 11, Line 58, Cl. 25, 3, delete "indica" insert --indicia--.

Column 12, Line 55, Cl. 26, 56, delete "kaypad" insert --keypad--.

Signed and Sealed this

Third Day of September, 1991

*Attest:*

HARRY F. MANBECK, JR.

*Attesting Officer*   *Commissioner of Patents and Trademarks*